United States Patent [19]

Leigh-Monstevens

[11] Patent Number: 4,852,352
[45] Date of Patent: Aug. 1, 1989

[54] MANUAL OVERRIDE FOR RELIEF OF PULSATOR CIRCUIT WITH RESERVOIR BALL VALVE

[75] Inventor: Keith V. Leigh-Monstevens, Troy, Mich.

[73] Assignee: Automotive Products plc, Warwickshire, England

[21] Appl. No.: 21,979

[22] Filed: Mar. 5, 1987

[51] Int. Cl.⁴ ............... B60T 11/26; F16K 15/18
[52] U.S. Cl. ........................... 60/585; 60/592; 137/519.5; 137/901
[58] Field of Search ............ 60/585, 592, 544; 137/519.5, 901

[56] References Cited

U.S. PATENT DOCUMENTS

| | | | |
|---|---|---|---|
| 2,098,736 | 11/1937 | Bannon et al. | 92/142 X |
| 4,120,315 | 10/1978 | Snyder | 137/519.5 |
| 4,257,448 | 3/1981 | Shiu | 137/519.5 |
| 4,507,923 | 4/1985 | Trabbie | 60/585 |
| 4,532,768 | 8/1985 | Focqueur | 60/585 |
| 4,606,367 | 8/1986 | Britt | 137/901 |

FOREIGN PATENT DOCUMENTS

| | | |
|---|---|---|
| 830428 | 3/1937 | France ............... 60/585 |
| 419310 | 11/1934 | United Kingdom . |
| 530247 | 12/1940 | United Kingdom . |
| 595199 | 11/1947 | United Kingdom . |
| 607953 | 9/1948 | United Kingdom . |
| 657744 | 9/1951 | United Kingdom . |
| 1002331 | 8/1965 | United Kingdom . |

Primary Examiner—Robert E. Garrett
Assistant Examiner—George Kapsalas
Attorney, Agent, or Firm—Krass & Young

[57] ABSTRACT

A hydraulic actuator assembly of the type including a hydraulic system comprising a master cylinder, a slave cylinder, and a conduit interconnecting the master and slave cylinder. One-way valve means are provided, either mounted on the master cylinder or interposed in the conduit interconnecting the master and slave cylinders, and these valve means function to block communication between the system and the associated reservoir when the system if pressurized but allow flow of replenishing fluid from the reservoir into the system when the system is depressurized to compensate for system losses and wear in the associated vehicular mechanism. The valve further includes a manual override member in the form of a plunger which is manually depressed and which moves a valving member of the valve to a position in which it establishes communication between the reservoir port and the system port so that fluid may be moved from the system and into the reservoir even when the system is pressurized.

7 Claims, 2 Drawing Sheets

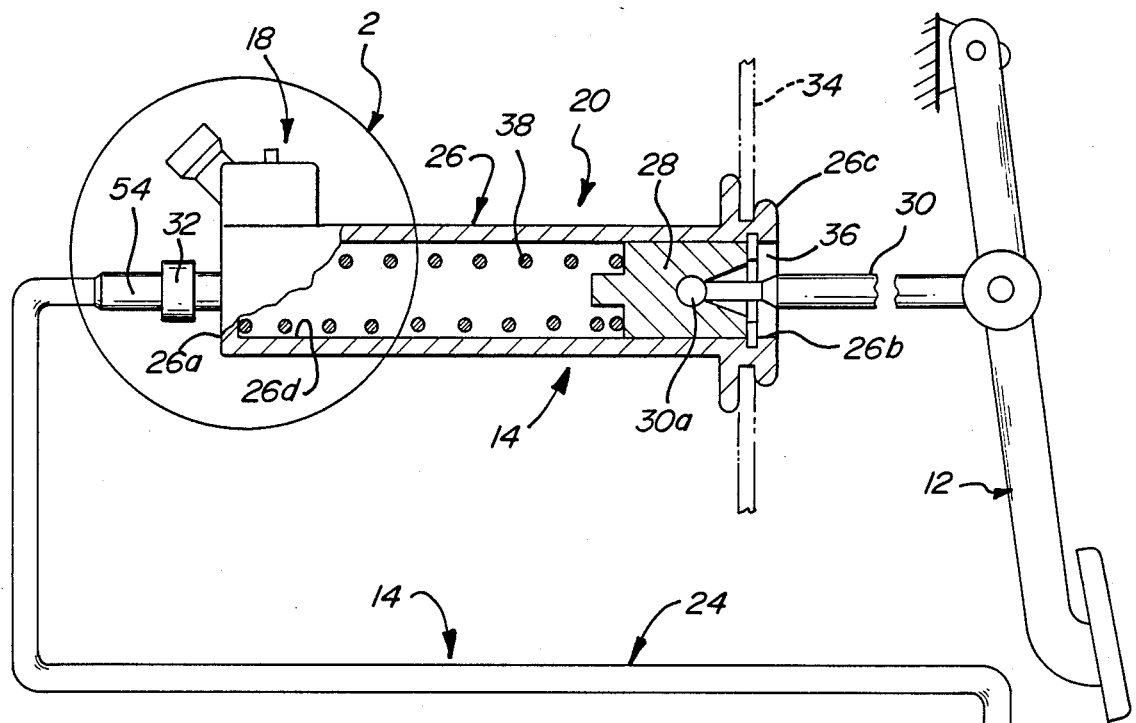
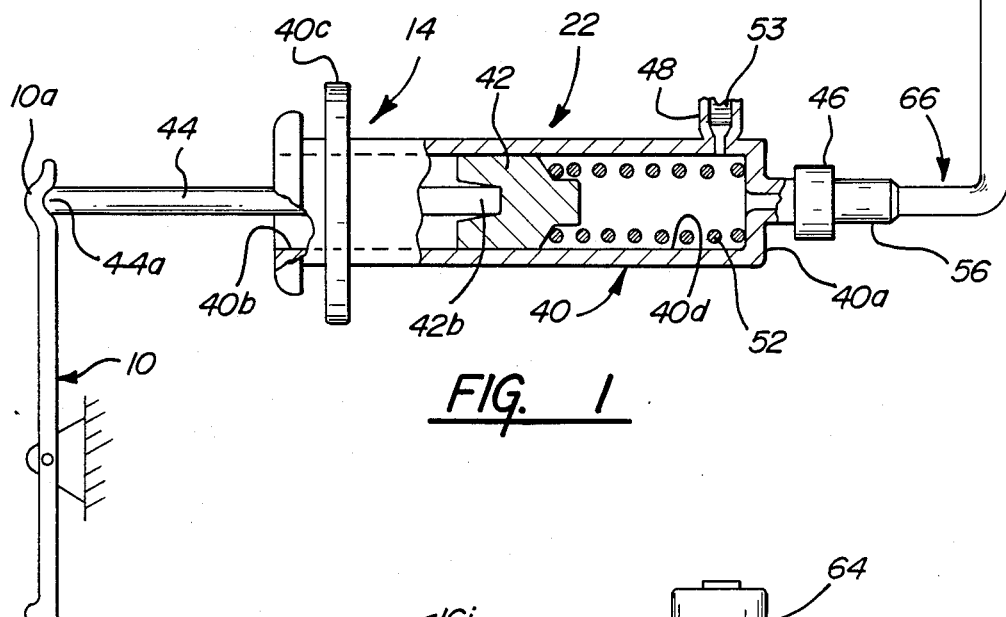
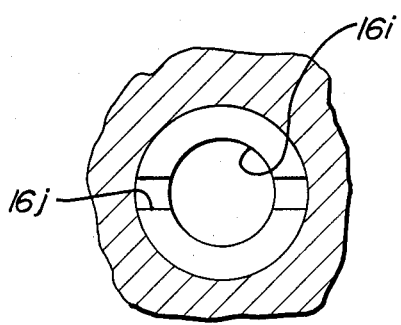
FIG. 3
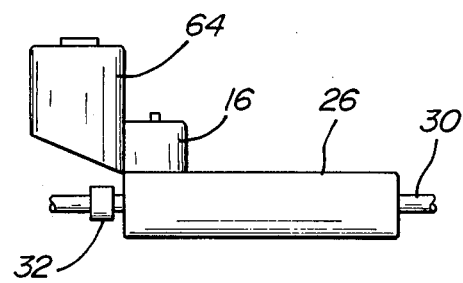
FIG. 4
FIG. 1

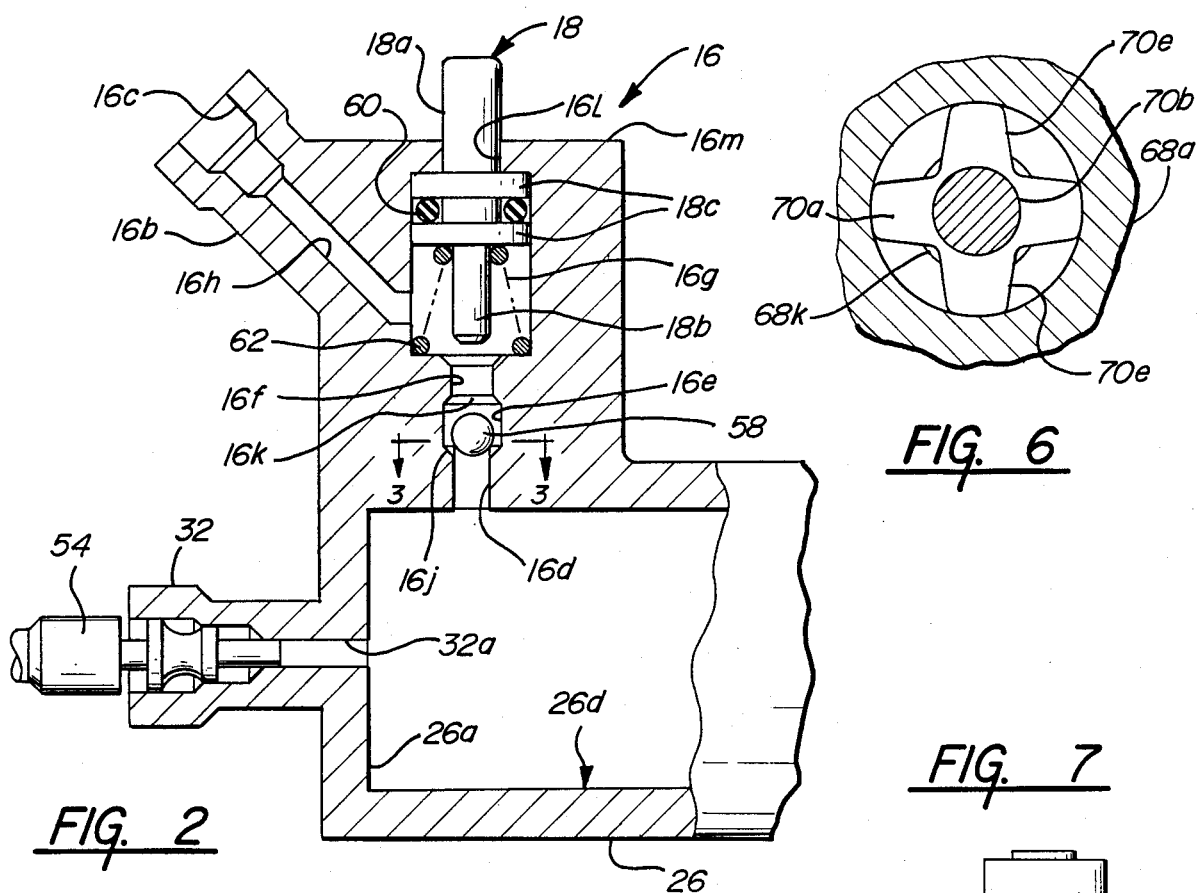
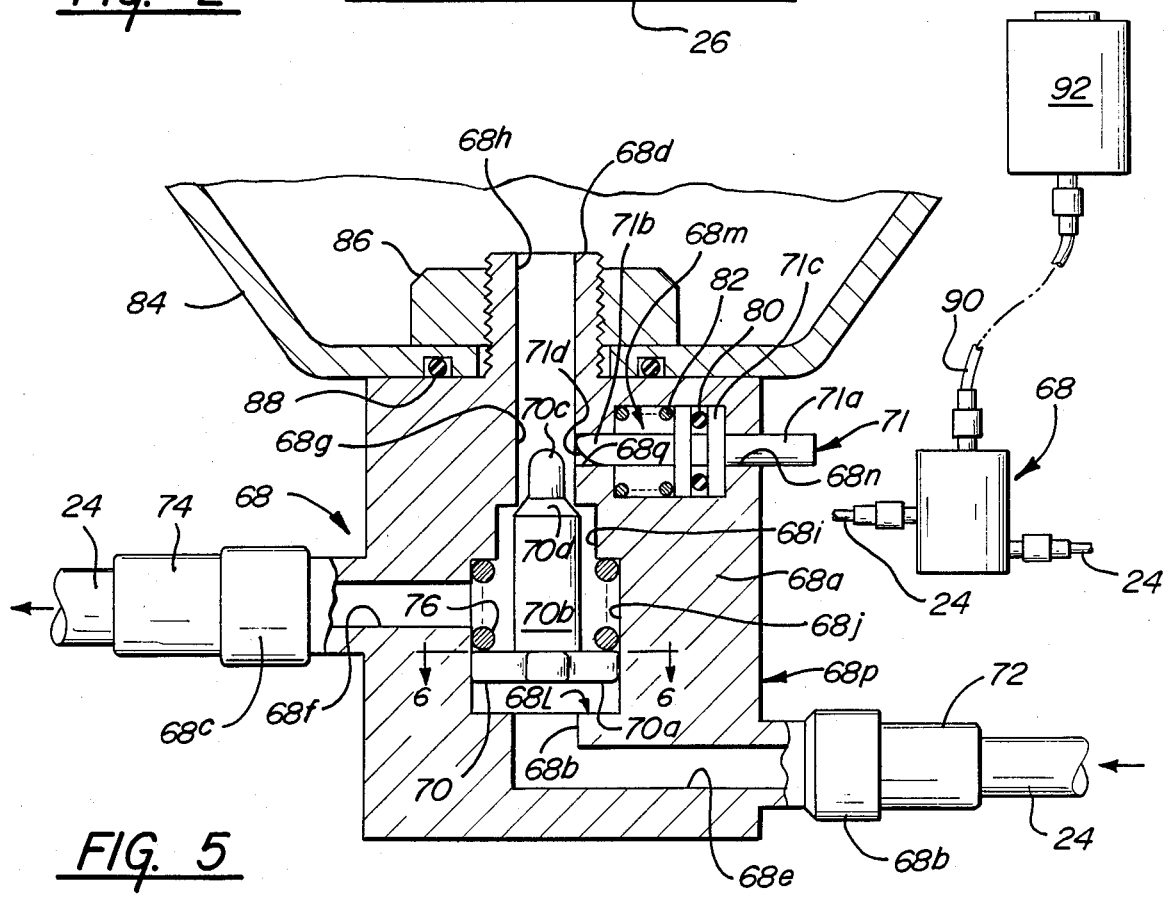

MANUAL OVERRIDE FOR RELIEF OF PULSATOR CIRCUIT WITH RESERVOIR BALL VALVE

BACKGROUND OF THE INVENTION

This invention relates to hydraulic actuator assemblies and more particularly to a preassembled and prefilled hydraulic actuator system for use in actuating the clutch of a motor vehicle.

Hydraulic actuators are known for operating motor vehicle clutches and other mechanisms at a remote location by way of a master cylinder and a slave cylinder combination. The master cylinder is operated, for example, by the clutch pedal, and the slave cylinder is connected to the clutch via a throwout bearing. The master and slave cylinders are interconnected by a high pressure line or conduit. Depressing the clutch pedal displaces the piston in the master cylinder to close a passage or port between the master cylinder fluid chamber and a fluid reservoir and to pressurize the connection to the slave cylinder. Displacement of the piston in the slave cylinder disengages the clutch.

It is also known to preassemble and prefill apparatus of this type before shipment of the assembly to a motor vehicle manufacturer for installation on the motor vehicle. The motor vehicle manufacturer need only to fix the master and slave cylinders in place and make simple mechanical connections to the clutch pedal and clutch bearing. See U.S. Pat. No. 4,599,860 entitled "Liquid Pressure Apparatus" issued July 15, 1986 to David Parsons and assigned to Automotive Products, plc of Warwickshire, England.

Prefilled and preassembled hydraulic actuator apparatus of the type shown in the aforementioned Parsons' patent have achieved wide acceptance, particularly in the automotive industry, because of the ease of installation in the motor vehicle, because of their extremely reliable operation over long periods of time, and because of their ability to automatically compensate for wear.

Various master cylinder designs have been employed as the master cylinder unit of these prefilled hydraulic actuator assemblies. One such design, known as a valve style master cylinder, employs a one-way valve on the master cylinder which operates in the depressurized system to provide replenishing fluid to the system when needed and operates in response to pressurization of the system to block communication between the master cylinder and the reservoir so as to optimize the operation of the slave cylinder. These valve style master cylinders, one of which is shown for example in U.S. Pat. No. 4,532,768, have the advantage of providing the most compact and least expensive master cylinder construction of all of the known prior art master cylinder constructions while retaining effective replenishing of the system when required and effective isolation of the reservoir from the system during pressurization of the system.

However, these valve style master cylinders sometimes present a problem because of their inability to allow the return of fluid to the reservoir when the system is pressurized. For instance, when the clutch of a motor vehicle is removed for repair, the slave cylinder extends to its fully extended position under the influence of the slave cylinder spring and the valve in the master cylinder opens to allow entry of replenishing fluid into the system in compensation for the extending movement of the slave piston. However, when it is desired to again retract the slave cylinder during reinstallation of the clutch in the motor vehicle, the valve on the master cylinder immediately senses the pressurization of the system resulting from the attempted retraction of the slave cylinder and precludes movement of fluid from the system into the reservoir with the result that the slave cylinder can be retracted only with great difficulty or not at all.

As a further instance, when the operator of the vehicle purposely or inadvertently slips his foot sideways off of the clutch pedal and allows the clutch to pop, the spring of the master cylinder moves the piston of the master cylinder somewhat more rapidly than the slave cylinder piston is moving under the influence of the clutch spring with the result that the system becomes depressurized and the valve on the master cylinder opens to allow replenishing fluid to enter the system. After several such instances of additional fluid being pumped into the system as a result of popping of the clutch, the clutch becomes difficult to operate and/or the clutch operates continually in a partially engaged or slipping condition.

SUMMARY OF THE INVENTION

This invention is directed to the provision of a master cylinder of the valve type which allows discharge of fluid from the master cylinder to the associated reservoir even with the cylinder in a pressurized condition.

This invention is further directed to the provision of a hydraulic actuator assembly employing a hydraulic cylinder of the valve type in which provision is made to allow return of fluid to the associated reservoir even in the pressurized condition of the actuator assembly.

The invention is intended for use with a hydraulic actuator assembly of the type including a hydraulic system including a master cylinder, a slave cylinder, and conduit means providing hydraulic communication between the output of the master cylinder and the input of the slave cylinder; and valve means, including a reservoir port adapted to be connected to a hydraulic fluid reservoir, operative in response to pressurization of the system to block communication between the system and the reservoir port and operative in response to depressurization of the system to establish communication between the system and the reservoir port to allow flow of replenishing reservoir liquid into the system. According to the invention, the hydraulic actuator assembly further includes manual override means which are operative when actuated to establish communication between the hydraulic system and the reservoir port of the valve means irrespective of the state of pressurization of the system. This arrangement allows fluid to be returned to the reservoir even with the associated system in a pressurized condition.

According to a further feature of the invention, the valve means includes a system port communicating with the hydraulic system and a valving member movable in response to pressurization of the system to a closed position blocking communication between the ports and movable in response to depressurization of the system to an open position allowing fluid communication between the ports; and the manual override means comprises a plunger member operative when depressed to move the valving member to its open position. This arrangement allows ready access to the manual override means and allows return of fluid to the reservoir by a simple depression of the manual override means.

According to a further feature of the invention, the valve means further includes a valve body defining the system and reservoir ports and further defining a valve chamber containing the valving member; and the plunger member is mounted on the valve body and is movable when depressed into engagement with the valving member. This arrangement provides a convenient and compact valve assembly capable of automatically replenishing the system and further capable of allowing return of the fluid to the reservoir even with the system pressurized.

In one embodiment of the invention, the valve assembly is rigid with the master cylinder and the system port of the valve communicates with the pressure chamber of the master cylinder.

In another embodiment of the invention, the valve means is positioned in the conduit extending between the output of the master cylinder and the input of the slave cylinder with the system port of the valve communicating with the interior of the conduit.

In either embodiment, the reservoir may be attached directly to the valve means or may be located remotely from the valve means.

BRIEF DESCRIPTION OF THE DRAWINGS

FIG. 1 is a somewhat schematic view of a hydraulic actuator assembly according to the invention arranged to actuate a clutch of a motor vehicle;

FIG. 2 is a detailed view taken within the circle 2 of FIG. 1;

FIG. 3 is a cross-sectional view taken on line 3—3 of FIG. 2;

FIG. 4 is a schematic view showing a modification of the assembly of FIGS. 1-3;

FIG. 5 is a view of an alternate form of valve mechanism for use with the invention hydraulic actuator assembly;

FIG. 6 is a cross-sectional view taken on line 6—6 of FIG. 5; and

FIG. 7 is a schematic view of a modified form of the assembly of FIGS. 5 and 6.

DETAILED DESCRIPTION OF THE PREFERRED EMBODIMENTS

The hydraulic actuator assembly of FIG. 1 is arranged to actuate a clutch release lever 10 of a motor vehicle clutch apparatus in response to depression of a clutch pedal lever 12 positioned within the passenger compartment of the motor vehicle. The actuator assembly includes a hydraulic system 14, valve means 16, and manual override means 18.

Hydraulic system 14 includes a master cylinder 20, a slave cylinder 22, and a conduit 24.

Master cylinder 20 includes an elongated cylinder 26, a piston 28, an input member 30, and an output fitting 32.

Cylinder 26 is elongated and includes a closed end 26a and an open end 26b. A flange means 26c adjacent open end 26b facilitates attachment of the cylinder in known manner to a vehicular bulkhead 34.

Piston 28 is slidably received within the pressure chamber 26d defined within cylinder 26 and is urged to a rest position against a snap ring 36 positioned in the open end of the cylinder by a coil spring 38 extending between the piston and the closed end 26a of the cylinder. Input member or piston rod 30 is pivotally secured at one end to clutch pedal lever 12 and swivelly mounted at its other ball end 30a within a socket defined by piston 28.

Output fitting 32 is formed integral with the end wall 26a of cylinder 26 and defines an output port 32a communicating with pressure chamber 26d.

Slave cylinder 22 includes a cylinder 40, a piston 42, an output member 44, an input fitting 46, and a bleed port 48.

Cylinder 40 includes a closed end 40a, an opened end 40b, and flange means 40c adapted to secure the slave cylinder to a bulkhead 50 in known manner.

Piston 42 is slidably positioned within the pressure chamber 40d of cylinder 40 and is urged toward the open end of the cylinder by a coil spring 52 extending between the piston and the closed end 40a of the cylinder.

Output member or piston rod 44 is received at one end 44a in a socket 10a defined at the upper end of clutch release lever 10 and is received at its other end 44b in a socket defined in piston 42. Input fitting 46 is formed integral with the end wall 40a of cylinder 40 and defines an input passage 46a communicating with the pressure chamber 40d of cylinder 40.

Bleed port 48 is formed integrally with cylinder 40 adjacent the closed end 40a of the cylinder and includes a grub screw 53 adapted to be selectively removed from port 48 to allow bleeding of air from the system.

Conduit 24 is formed of a suitable high pressure plastic material, such as a flexible nylon tubing, and extends between the output fitting 32 of master cylinder 20 and the input fitting 46 of slave cylinder 22. A coupling 54 coacts sealingly and in known manner with output fitting 32 on the master cylinder to establish sealed fluid communication between the interior of the master cylinder and conduit 24, and an identical coupling 56 on the other end of conduit 24 coacts with input fitting 46 of the slave cylinder to establish a sealed fluid communication between conduit 24 and the pressure chamber 40d of the slave cylinder.

Valve means 16 is formed integrally with cylinder 26 of master cylinder 20 adjacent the closed end 26a of the cylinder and in upstanding relation to the cylinder. Valve means 16 includes a valve body 16a, a reservoir fitting 16b defining a reservoir port 16c, a system port 16d communicating with the interior of pressure chamber 26d, a valve chamber 16e, and a ball valving member 58 positioned within chamber 16e. Valve chamber 16e communicates at its lower end with the upper end of system port 16d and at its upper end with a reduced diameter bore 16f formed within valve body 16a. Bore 16f in turn communicates at its upper end with a chamber 16g formed within valve body 16a and chamber 16g in turn communicates at one side thereof with an angled passage 16h extending upwardly through fitting 16b for communication with reservoir port 16c. It will be seen that chamber 16e, bore 16f, chamber 16g, and passage 16h coact to provide fluid communication between system port 16d and reservoir port 16c.

Valving ball 58 has a rest position seen in FIG. 2 in which it seats on the annular edge 16i defined at the juncture of the upper end of bore 16d and the lower end of chamber 16e. In this position, a restricted amount of replenishing fluid flow is allowed around the ball and through port 16d into the interior of pressure chamber 26d by virtue of diametrically opposed slots 16j providing downward flow around the ball. Ball 58 has a further, pressurized position in which it is raised within chamber 16e and coacts with the lower annular edge 16k of bore 16f to totally block communication between reservoir port 16c and system port 16d.

Manual override member 18 is in the form of a plunger and includes an upper button portion 18a projecting upwardly through a bore 16l in valve body 16 to a location above the upper surface 16m of the valve body; a lower striker portion 18b positioned within chamber 16g; and spaced annular flange portions 18c positioned within chamber 16g and coacting with an O-ring 60 to sealingly and slidably mount plunger 18 within chamber 16g. A conical coil spring 62 engages lower annular flange portion 18c and normally maintains the plunger in the raised position illustrated in FIG. 2.

In the operation of the embodiment of FIGS. 1-3, depression of clutch pedal lever 12 results in a power stroking movement of piston 28 within master cylinder 26 and consequent discharge of pressure fluid through conduit 24 to the input of slave cylinder 22 where it acts to move the piston 42 within slave cylinder 40 and thereby pivot clutch release lever 10 about its pivot axis in a sense to disengage the clutch of the vehicle. As soon as piston 28 begins its power stroke movement within pressure chamber 26d, the pressure of the hydraulic fluid pressurizes the system and moves ball valving member 58 to its raised position in sealing engagement with annular edge 16k to preclude communication between system port 16d and reservoir port 16c so as to maintain the desired pressure in the system to effectively actuate the slave cylinder and thereby the clutch of the vehicle. When the clutch pedal lever 12 is later released by the operator to allow the system to return to its rest position of FIG. 1, the system is depressurized and the ball valving member 58 moves to its lowered position where it coacts with slots 16j to allow restricted flow of replenishing fluid from the reservoir into the system in compensation for system losses or wear in the associated clutch mechanism.

On occasion, fluid flows into the system from the reservoir in an amount that is in excess of the volume required to provide proper operation of the system and it is necessary to remove this excess liquid from the system to again provide proper operation of the system. For example, when the associated clutch of the motor vehicle is removed for repair or replacement, the output member of the slave cylinder is released from engagement with clutch release lever 10 so that the piston 42 of the slave cylinder moves to an extended position under the influence of spring 52 with the result that fluid flows through valve 16 from the reservoir to fill the now expanded volume of the system. When the clutch has been reinstalled and it is desired to again retract the slave cylinder to place it in proper engagement with the clutch release lever 10, valve 16 immediately senses the pressurization of the system resulting from the attempted movement of the slave cylinder piston 42 toward the closed end of the cylinder and moves to its raised or closed position to block the flow of fluid from the system to the reservoir with the result that it is difficult if not impossible to move the slave cylinder to its retracted position and reinstall it with respect to the clutch release lever. In this situation, pushbutton portion 18a of plunger 18 is depressed to move striker portion 18b of the plunger into engagement with ball valving member 58 and unseat the ball from edge 16k so as to allow fluid to flow from the system upwardly through the system port 16d and through the reservoir port 16c for return to the reservoir so as to allow the slave cylinder to be retracted and reinstalled with respect to the clutch release lever, whereafter the pushbutton portion 18a of the plunger is released to allow spring 62 to return the plunger to its raised or rest position as seen in FIG. 2 and to allow ball 58 to seek either its pressurized or depressurized position, depending on the condition of the system.

Similarly, if an excess amount of fluid is drawn into the system from the reservoir as a result of excessive popping of the clutch pedal so that the master cylinder moves ahead of the slave cylinder and depressurizes the system to allow unwanted flow of liquid into the system from the reservoir, the pushbutton portion 18a of the plunger 18 may be depressed, either by the vehicle operator or by a service person, to again unseat ball valving member 58 from annular edge 16k and allow the excess fluid to flow from the system and into the reservoir to reestablish the proper volume of fluid within the system consistent with proper operation of the clutch mechanism.

Although the invention valve as seen in FIGS. 1-3 is intended for use with a remote reservoir, the invention valve may also be used with a reservoir attached directly to the valve body. Such an arrangement is seen in FIG. 4 in which a reservoir 64 is seen directly secured to valve 16 so that the reservoir feeds directly into the reservoir port of the valve 16 for selective delivery to the system.

Further, although the invention is seen in FIGS. 1-4 as applied to a valve which is integral with the master cylinder, the invention may also be applied at other locations within the system. For example, as seen in FIG. 5, the invention valve and valve override member may be provided at any point within the conduit 24, such for example, as at the location 66 along the conduit 24 as seen in FIG. 1.

The valve and valve override assembly in FIG. 5 is seen generally at 68 and includes a main body portion 68a; an inlet fitting 68b; an outlet fitting 68c; a reservoir fitting 68d; a valving member 70; and a manual override member or plunger 71.

Inlet fitting 68b defines an inlet passage 68e adapted to be fluidly connected to conduit 24 by a fitting 72, and outlet fitting 68c defines an outlet passage 68f intended to be fluidly connected to conduit 24 by a coupling 74.

Valve body 68 includes a central bore 68g which extends upwardly and concentrically through reservoir fitting 68d to define a reservoir port 68h. Body 68a further defines a counterbore 68i, a further counterbore 68j, and a lower bore 68k extending from the lower end of counterbore 68j to inlet passage 68e. Counterbore 68i defines a system port providing communication between reservoir port 68h and the hydraulic system.

Valving member 70 is slidably positioned within counterbores 68i and 68j and includes a lower guide portion 70a, an upstanding central shaft portion 70b, a nose portion 70c, and a conical annular seat 70d at the juncture of the upper end of shaft portion 70b and the lower end of nose portion 70c. A coil spring 76 is positioned in counterbore 68j and normally urges valve member 70 downwardly into seating engagement with an annular shoulder 68l formed at the juncture of the lower end of counterbore 68j and the upper end of bore 68k. Guide portion 70a of valve member 70 is cut away at circumferentially spaced locations 70e to allow flow of fluid around the guide portion.

Manual override member or plunger 71 is positioned within a transversely extending chamber 68m defined within valve body portion 68a and includes a button portion 71a, a striker portion 71b, and annular flange portions 71c. Button portion 71a passes through a bore 68n in valve body 68a and projects from the side face hole 68p of the valve body. Striker portion 71b is positioned in a bore 68q extending between the chamber 68m and bore 68g, and flange portions 71c are positioned slidably in chamber 68m. The leading edge 71d of striker portion 71b is beveled for camming coaction with the rounded free end of valve member nose portion 70c. An O-ring 80 is positioned between flange portions 78c to provide sealing as between chamber 68m and plunger 78 and a coil spring 82 is seated against a flange portion 71c to urge the plunger to its rest position in which striker portion 71b is withdrawn from passage 68g.

In the operation of the embodiment of FIGS. 5 and 6, spring 76 normally maintains valving member 70 in its downward position seated against shoulder 68l in which communication is established between reservoir port 68h and system port 68i. However, when the clutch pedal of the vehicle is depressed to stroke the master cylinder and send pressurized fluid through conduit 24, valving member 70 is moved to its raised or closed position as seen in FIG. 5 to block communication between the reservoir port and the system port. Note in this regard, that although pressurized fluid acts on both sides of guide portion 70a of the valving member, the effective lower face area of the guide portion 78 exceeds the effective upper face area of the guide portion by the area of shaft portion 70b so that pressurized fluid in the system will always urge the valve member up and urge conical seat 70d into seating coaction with the lower annular edge of bore 68g to block communication between the reservoir port and the system port. As soon as the system is depressurized by release of the clutch pedal, valve member 70 returns to its lowered position under the influence of spring 76 to allow communication between the reservoir port and the system port and allow flow of replenishing liquid from the reservoir into the system, if necessary, to compensate for system losses and wear in the clutch mechanism.

As with the FIG. 1-3 embodiment, there are situations (repeated popping of the clutch pedal and repair or replacement of the associated clutch mechanism) where it is desired to establish fluid communication between the system port and the reservoir port even in the pressurized condition of the system. In these instances, pushbutton portion 71a of plunger 71 is depressed to move the beveled edge 71a of the striker portion 71b of the plunger into coacting camming engagement with the rounded end of nose portion 70c of the valving member and thereby move the valving member downwardly against the pressure of the fluid in the system and move conical seat 70d away from the lower edge of bore 68g to allow fluid communication between the reservoir port and the system port.

The valve mechanism of the invention is seen in FIG. 5 in association with a reservoir 84 which is directly attached to the upper face of valve body 68a by a nut 86 threadably engaging the threaded exterior of reservoir fitting 68d with an O-ring 88 providing a seal as between the reservoir 84 and the upper face of the valve body to preclude fluid leakage from the reservoir. However, as with the embodiment of FIGS. 1-3, the invention as employed in the conduit 24 may also be used with either an integral reservoir or a remotely positioned reservoir. A remotely positioned reservoir arrangement is seen in FIG. 7 wherein a further conduit 90 extends from a reservoir port on the valve 68 for communication at its other end with an outlet fitting on the remote reservoir 92.

The invention will be seen to provide hydraulic actuator assembly employing a master cylinder of the valve type and in which means are provided to readily and effectively communicate the system with the associated reservoir even in the pressurized condition of the system. The invention thus provides an assembly which retains all of the low cost and compactness advantages of the master cylinder of the valve type and which effectively and economically eliminates the flow limitations imposed by the valve type master cylinder design.

Whereas the preferred embodiments of the invention have been illustrated and described in detail, it will be apparent that various changes may be made in the disclosed embodiments without departing from the scope or spirit of the invention.

I claim:
1. A hydraulic actuator assembly comprising:
   (A) a hydraulic system including
     (1) a master cylinder including an input member and an output port,
     (2) a slave cylinder including an output member and an input port, and
     (3) conduit means providing hydraulic communication between said master cylinder output port and said slave cylinder input port whereby stroking movement of said master cylinder input member into said master cylinder delivers pressure fluid from said master cylinder through said master cylinder output port, through said conduit means and through said slave cylinder input port to said slave cylinder to extend said slave cylinder output member;
   (B) valve means positioned in said conduit and including a reservoir port adapted to be connected to a hydraulic fluid reservoir, a system port communicating with said conduit, and a valving member, said valve means being operative in response to pressurization of said system to move said valving member to a closed position in which it blocks communication between said system port and said reservoir port and operative in response to depressurization of said system to move said valving member to an open position in which it establishes communication between said system port and said reservoir port to allow flow of replenishing reservoir fluid into said system or flow or fluid into said reservoir from said system; and
   (C) manual override means operative when actuated to move said valving member to its open position, and thereby establish communication between said system and said reservoir port, irrespective of the state of pressurization of said system so as to allow retraction of said slave cylinder output member into said cylinder without a corresponding extending movement of said master cylinder input member out of said master cylinder.
2. A hydraulic actuator assembly according to claim 1 wherein:
   (D) said assembly further includes a reservoir communicating with said reservoir port.
3. A hydraulic actuator assembly comprising:
   (A) a hydraulic system including

(1) a master cylinder including an input member and an output port,
(2) a slave cylinder including an output member and an input port, and
(3) conduit means providing hydraulic communication between said master cylinder output port and said slave cylinder input port whereby stroking movement of said master cylinder input member into said master cylinder delivers pressure fluid from said master cylinder through said master cylinder output port, through said conduit means, and through said slave cylinder input port to said slave cylinder to extend said slave cylinder output member;

(B) valve means, including a reservoir port adapted to be connected to a hydraulic fluid reservoir, a system port communicating with said conduit, and a valving member, operative in response to pressurization of said system to move said valving member to a closed position in which it blocks communication between said system port and said reservoir port and operative in response to depressurization of said system to move said valving member to an open position in which it establishes communication between said system port and said reservoir port to allow flow of replenishing reservoir fluid into said system or flow of fluid into said reservoir from said system; and (C) manual override means operative when actuated to move said valving member to its open position, and thereby establish communication between said system and said reservoir port, irrespective of the state of pressurization of said system so as to allow retraction of said slave cylinder output member into said cylinder without a corresponding extending movement of said master cylinder input member out of said master cylinder.

4. A hydraulic actuator assembly according to claim 1 wherein:
(D) said manual override means comprises a plunger member operative when depressed to move said valving member to its open position.

5. A hydraulic actuator assembly according to claim 4 wherein:
(E) said valve means further includes a valve body defining said ports and defining a valve chamber containing said valving member; and
(F) said plunger member is mounted on said valve body and is movable when depressed into engagement with said valving member.

6. A hydraulic actuator assembly according the claim 1 wherein:
(D) said valve means is rigid with said master cylinder and said system port communicates with the pressure chamber of said master cylinder.

7. A hydraulic actuator assembly according to claim 6 wherein:
(E) said assembly further includes a reservoir communicating with said reservoir port.

* * * * *